US009761094B2

(12) United States Patent
Simon

(10) Patent No.: US 9,761,094 B2
(45) Date of Patent: Sep. 12, 2017

(54) HAPTIC CONTROLLER

(71) Applicant: EXPRESSIVE, Montreuil (FR)

(72) Inventor: Eric Simon, Marigny (FR)

(73) Assignee: EXPRESSIVE, Montreuil (FR)

( * ) Notice: Subject to any disclaimer, the term of this patent is extended or adjusted under 35 U.S.C. 154(b) by 0 days.

(21) Appl. No.: 15/302,507

(22) PCT Filed: Apr. 8, 2015

(86) PCT No.: PCT/FR2015/050907
§ 371 (c)(1),
(2) Date: Oct. 7, 2016

(87) PCT Pub. No.: WO2015/155470
PCT Pub. Date: Oct. 15, 2015

(65) Prior Publication Data

US 2017/0024980 A1 Jan. 26, 2017

(30) Foreign Application Priority Data

Apr. 8, 2014 (FR) ..................................... 14 53099

(51) Int. Cl.

| | |
|---|---|
| ***G08B 6/00*** | (2006.01) |
| ***G09B 21/00*** | (2006.01) |
| ***H04B 3/36*** | (2006.01) |
| ***G10H 1/34*** | (2006.01) |

(52) U.S. Cl.
CPC ............... *G08B 6/00* (2013.01); *G10H 1/344* (2013.01); *G10H 1/346* (2013.01); *G10H 1/348* (2013.01); *G10H 2220/311* (2013.01)

(58) Field of Classification Search
CPC .......... G08B 6/00; G10H 1/344; G10H 1/346; G10H 1/348; G10H 2220/311
See application file for complete search history.

(56) References Cited

U.S. PATENT DOCUMENTS

| | | | | |
|---|---|---|---|---|
| 2,953,958 | A | 9/1960 | George | |
| 7,486,273 | B1 * | 2/2009 | Aviles | G06F 3/016 345/156 |
| 2001/0033269 | A1 | 10/2001 | Hosoya | |
| 2002/0016204 | A1 | 2/2002 | Kanno et al. | |
| 2003/0131720 | A1 | 7/2003 | Sakurada | |
| 2011/0260988 | A1 * | 10/2011 | Colgate | G06F 3/016 345/173 |

(Continued)

FOREIGN PATENT DOCUMENTS

| | | |
|---|---|---|
| EP | 2211334 A2 | 7/2010 |

*Primary Examiner* — Erin File
(74) *Attorney, Agent, or Firm* — MH2 Technology Law Group, LLP

(57) ABSTRACT

Disclosed is a haptic controller that includes a base, a control member, a control support that is adapted to enable a variable force to be applied at one or more points, and a connection member that connects the control member to the base. The controller features two parallel-axis pivots that connect the connection member to the base and to the control member. The controller also includes damper elements that are arranged respectively between the base and the connection member, and between the connection member and the control member. The damper elements damp the pivoting of the connection member and of the control member when a force is applied to the control support.

10 Claims, 2 Drawing Sheets

(56) References Cited

U.S. PATENT DOCUMENTS

Figure 1:
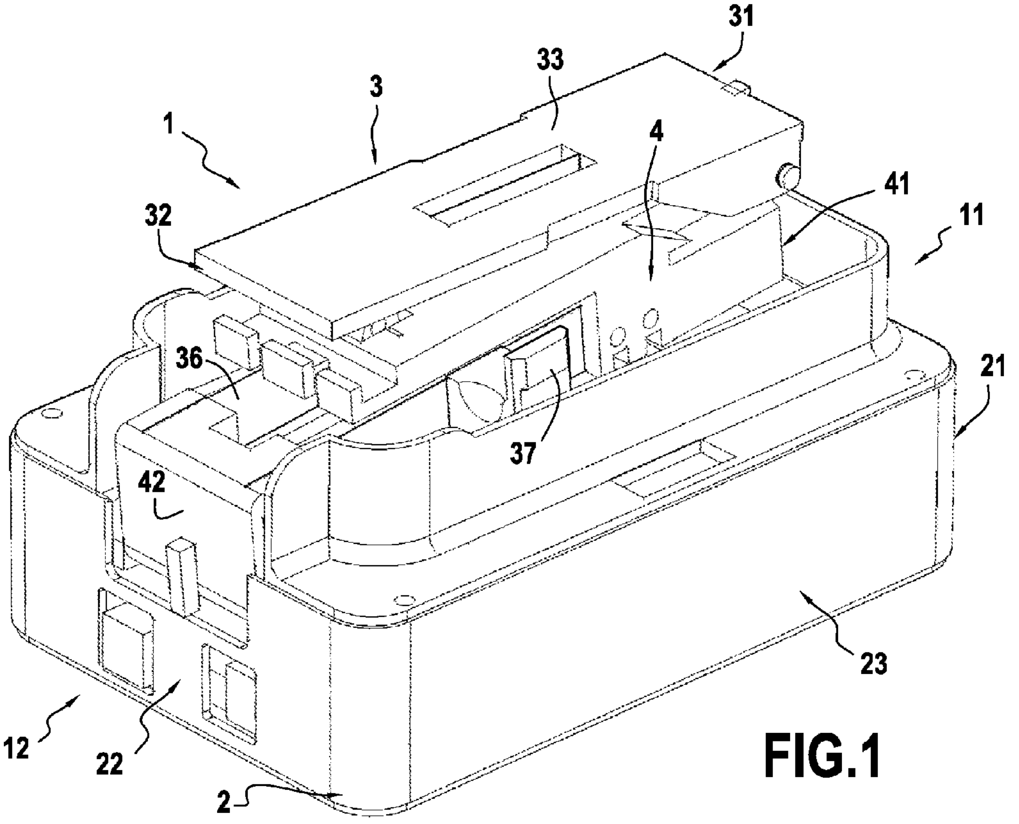

| | | | | |
|---|---|---|---|---|
| 2015/0177838 | A1* | 6/2015 | Bae | G06F 3/016<br>345/173 |
| 2015/0177899 | A1* | 6/2015 | Degner | G06F 3/016<br>345/174 |

* cited by examiner

HAPTIC CONTROLLER

GENERAL TECHNICAL FIELD

The present invention relates to the field of haptic controllers comprising a control for controlling one or more sound characteristics during a sound production.

STATE OF THE ART

When an operator uses electronic or digital instruments, the operator often has one or more haptic controllers for the purpose of enabling the properties of the emitted sound to be controlled in real time.

It is thus common practice to use potentiometers or knobs for implementing such controls.

Nevertheless, existing devices present limitations not only in terms of the control possibilities they provide, but also in terms of similarity with the musical instruments. Such similarity is particularly looked-for by users, who are first and foremost musicians, for whom it is preferable for controls to be intuitive and as similar as possible to the instrument.

SUMMARY OF THE INVENTION

The present invention thus aims at solving at least partially these problems, and it proposes a haptic controller comprising:

- a base;
- a control member having a proximal end, a distal end, and a control support adapted to enable a variable force to be applied at one or more points between the proximal end and the distal end; and
- a connection member connecting the control member to the base, and having a proximal end and a distal end;

the haptic controller being characterized in that:

- the distal end of the connection member is connected to the base by a distal pivot enabling the connection member to pivot relative to the base about an axis X2-X2, and the proximal end of the connection member is connected to the proximal end of the control member by a proximal pivot enabling the control member to pivot relative to the connection member about an axis X1-X1 parallel to the axis X2-X2; and
- the haptic controller further comprises damper elements arranged respectively between the base and the connection member, and between the connection member and the control member, in order to damp the pivoting of the connection member and of the control member when a force is applied to the control support.

In a particular embodiment, the damper elements are configured so as not to be in alignment relative to a direction normal to the control support.

The haptic controller then typically comprises:

- a first damper element arranged between the base and the connection member is arranged in the proximity of the proximal pivot; and
- a second damper element arranged between the connection member and the control member is arranged in the proximity of the distal pivot.

In a second particular embodiment, the connection member has a first segment and a second segment connected together by two spring blades arranged in parallel with each other, so as to enable the control member to move in translation along the axis X1-X1 relative to the base.

Said spring blades are typically associated with an adjuster element adapted to modify the stiffness of said spring blades.

In a particular embodiment, said damper elements are elements presenting a deformation profile that is non-linear as a function of the applied force.

By way of example, said damper elements are thus deformable cylinders, each having a bore arranged parallel to its axis, and offset from that axis, section members having a plane base and a curved face opposite from said plane base and typically including a longitudinal bore, or deformable domes, e.g. hemispherical domes.

In a particular embodiment, the control member comprises a control support adapted to receive a removable control surface.

In a particular embodiment, the haptic controller further comprises a controller and sensors adapted to measure the deformation of the damper elements and to deliver an output signal as a function of the measured deformations.

In a variant, the haptic controller comprises a controller and sensors adapted to measure the movements of the connection member and of the control member, and to deliver an output signal as a function of the measured movements.

PRESENTATION OF THE FIGURES

Figure 2:
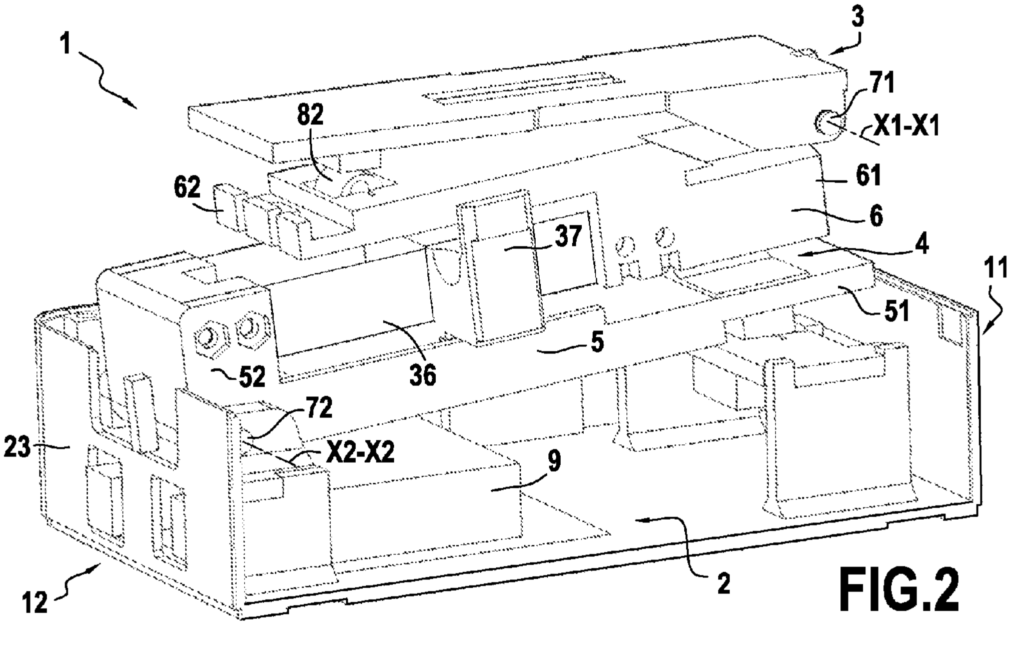
Figure 3:
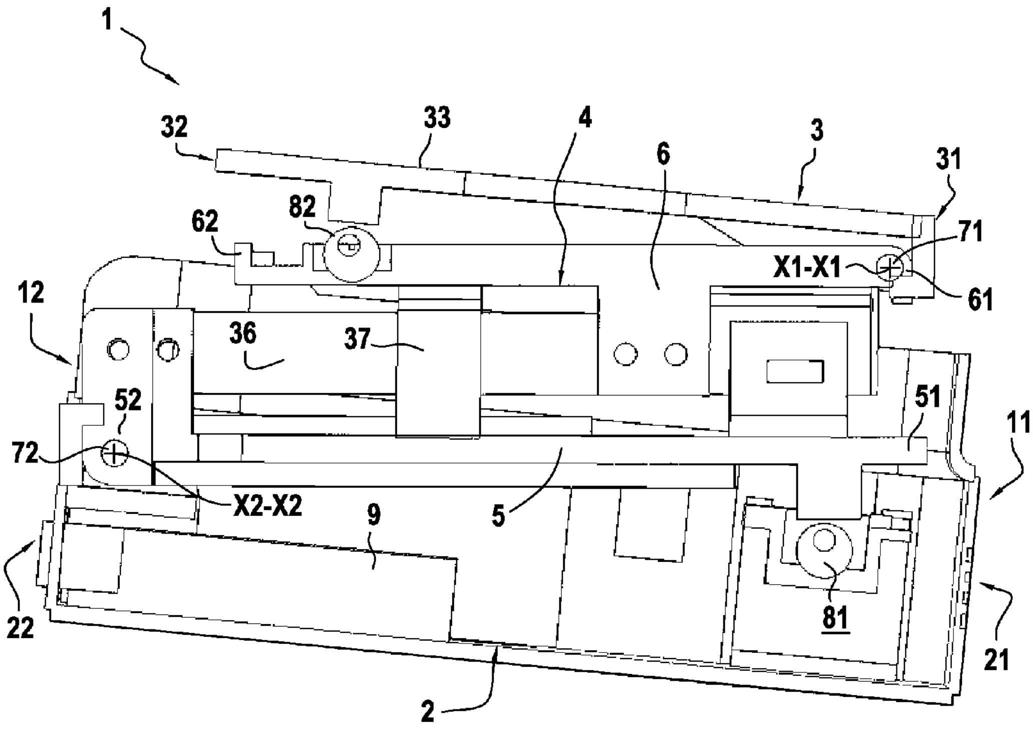

Other characteristics, objects, and advantages of the invention appear from the following description, which is purely illustrative and non-limiting, and which should be read with reference to the accompanying drawings, in which:

FIG. 1 is an overall view of an example controller in an aspect of the invention; and FIGS. 2 and 3 are fragmentary views in section of the controller shown in FIG. 1.

In all of the figures, elements in common are identified by identical numerical references.

DETAILED DESCRIPTION

FIGS. 1 to 3 are different views of an example of a haptic controller in an aspect of the invention.

The haptic controller 1 as shown comprises a base 2, and control member 3, and a link member 4 connecting the control member 3 to the base 2. The base 2 is associated with a box 23 within which the various elements described hereafter are located.

An end 11 and an end 12 of the haptic controller 1 are arbitrarily defined as a proximal end 11 and as a distal end 12 for the purposes of description.

Below, various elements of the controller 1 are defined as having a proximal end and a distal end, with reference to the proximal end 11 and the distal end 12 of the controller 1, the proximal end of a given component being the end of that component that is closest to the proximal end 11 of the controller 1, and the distal end of the component being its end that is closest to the distal end 12 of the controller 1.

The base 2 is thus defined as having a proximal end 21 and a distal end 22, and the control member 3 is thus defined as having a proximal end 31 and a distal end 32.

The control member 3 is connected to the base 2 by the connection member 4.

The connection member 4 is configured to form a Z-shaped assembly of the control member 3 on the base 2, thereby forming two successive lever effects relative to the base 2.

The connection member 4 has pivot connections, configured as follows.

A distal pivot 72 connects the distal end 42 of the connection member 4 to the distal end 22 of the base 2, enabling the connection member 4 to pivot relative to the base 2 about an axis X2-X2.

A proximal pivot 71 connects the proximal end 41 of the connection member 4 to the proximal end 31 of the control member 3, enabling the control member 3 to pivot relative to the connection member 4 about an axis X1-X1 parallel to the axis X2-X2.

Damper elements are arranged so as to damp the pivoting movements of these various elements.

A first damper element 81 is thus arranged between the base 2 and the connection member 4, and a second damper element 82 is arranged between the connection member and the control member 3.

The damper members 81 and 82 damp the pivoting movements of the connection member 4 and of the control member 3.

The damper elements 81 and 82 are typically cylinders, each having a bore parallel to its axis, and possibly being offset relative to the axis so as to form tubular elements of thickness that is not constant, as shown in FIG. 3. The damper elements may also be deformable domes, typically hemispherical domes. The damper elements may also be section members having a plane base and a curved opposite end, and including a longitudinal bore. By way of example, the damper elements may thus be square in section with one face being in the form of a circular arc, and having a longitudinal bore formed in the bulge made by the circularly arcuate face. The damper elements may also have a section made up of a circular portion and of a rectangular portion, the portions being connected together by a side of the rectangular portion.

Such elements presenting a plane base are advantageous in terms of positioning, in that they do not require special arrangements.

The damper elements 81 and 82 are thus advantageously elements presenting a deformation profile that is not linear as a function of the applied force, thereby providing a user with finer control over actions of small magnitude.

The damper elements 81 and 82 may advantageously be modified as a function of the desired application.

The control member 3 is configured to present a control support 33, typically a plane surface, extending from its proximal end 31 to its distal end 32, so that a user can exert a pressure force on one or more points of the control support 33, thereby defining an action applied by the user to the haptic controller 1. A control surface is typically fitted on the control support 33. The control surface is advantageously removable, thus enabling it to be changed as a function of the user or of the sound production. The control surface may for example be made of wood, and it may be fitted on the control support 33 by fastener means. The user then exerts a force on the control surface, which force is transmitted to the control support 33. The control surface may be fitted with various means such as touch sensors, sensors for tapping.

The damper elements 81 and 82 are configured so as to be mutually offset relative to a vertical direction defined as being a direction normal to the control support 33 of the control member 3.

In the example shown, the damper elements 81 and 82 are arranged in such a manner that the first damper element 81 is closer to the proximal end 11 of the haptic controller 1 than is the second damper element 82. The second damper element 82 is closer to the distal end 12 of the haptic controller 1 than is the first damper element 81. The first damper element 81 is thus arranged close to the proximal pivot 71, while the second damper element 82 is arranged close to the distal pivot 72.

When the user applies an action to the haptic controller 1, the user thus exerts a pressure force at one or more points of the control support 33 of the control member 3, tending to move it towards the base 2.

This control force leads to pivoting at the pivots 72 and 71 as a function of the point(s) of application and as a function of the magnitude of the applied force, and thus a compression force on the damper elements 81 and 82 likewise varies as a function of the point(s) of application and of the magnitude of the applied force.

The damper elements 81 and 82 thus advantageously provide a force return function to the user as function of the applied action.

The compression force is not distributed in the same way between the damper elements 81 and 82 as a function of the point(s) at which the action is applied.

For example, with reference to the configuration shown in the figures, when the action is a compression force applied in the proximity of the proximal end 31 of the control member 3, the structure of the haptic controller 1 implies that the first damper element 81 is subjected to a compression force that is greater than that to which the second damper element 82 is subjected.

Conversely, when the action is a compression force applied in the proximity of the distal end 32 of the control member 3, the structure of the controller implies that the second damper element 82 is subjected to a compression force that is greater than that to which the first damper element 81 is subjected.

The haptic controller 1 thus typically includes a set of sensors adapted to measure the deformation of the damper elements 81 and 82, and/or to measure the pivoting of the pivots 72 and 71, or more generally the movements of the various elements such as the connection member 4 and the control member 3, these measurements thus delivering an output signal that varies with the action applied by the user, and that is subsequently typically processed by a computer 9, shown herein as being arranged in eth base 2, applying an algorithm for modifying one or more characteristics during a sound production.

The control support 33 of the control member 3 is typically a removable surface that may be coupled to the control member 3 by fastener means in order to enable the user to modify the control support 33, and in particular the material from which it is made. The control support 33 is thus typically made of wood, thereby giving the user a touch sensation that is closer to that of a conventional musical instrument than the sensation from controllers that are commonly made of plastics materials or of metals.

In the particular embodiment shown in the figures, the connection member 4 has a first segment 5 and a second segment 6, each in the form of a beam.

Each segment 5 and 6 has a respective proximal end 51 or 61 and a respective distal end 52 or 62.

In this embodiment, the first segment 5 and the second segment 6 are connected together by two spring blades 36 arranged in parallel, so as to enable the second segment 6 to move relative to the first segment 5.

Each of the spring blades 36 enables the second segment 6 to pivot relative to the point where the spring blade is attached to the first segment 5. However, since the spring blades 36 are arranged in parallel, the movement made possible by these two spring blades 36 is thus close to a movement in rotation with very small curvature, which can be considered as being a movement in translation along the axis X1-X1 of the second segment 6 relative to the first segment 5. This movement is therefore referred to herein as being a movement in translation. The axis X2-X2 is parallel to the axis X1-X1; the movement in translation of the second segment 6 relative to the first segment 5 is thus likewise along the axis X2-X2.

This structure thus provides an additional degree of freedom for the control support 33 of the haptic controller 1, thereby providing a user with an additional level for taking action.

The haptic controller 1 then typically has one or more sensors measuring the force in translation along the axis X1-X1 applied to the control member 3, and delivering a corresponding output signal that is then typically processed by means of an algorithm in order to modify one or more characteristics during a sound production.

The spring blades 36 are typically associated with an adjuster element 37 adapted to modify the stiffness of the spring blades 36, e.g. an element that is mounted to slide relative to the spring blades 36 so that its sliding modifies the stiffness of said spring blades 36. The movement in translation of the control support 33 of the control member 3 along the axis X1-X1 can thus be modulated via the adjuster element 37.

The haptic controller 1 as described thus provides a very wide variety of options in terms of control, enabling actions to be taken along a plurality of axes and at a plurality of points in order to modify characteristics during a sound production. The proposed haptic controller thus provides real time control by touch over a plurality of characteristics or combinations of characteristics, the characteristics or combinations of characteristics being controllable independently or in association. The proposed control is also finer, is capable of adapting to different applications, and provides a user interface that is closer to that of a musical instrument than that of a basic control member such as a knob or a pedal.

The proposed haptic controller 1 may be made in the form of an independent controller suitable for connecting to a music production machine, or it may be incorporated in the structure of a music production machine.

What is claimed is:

1. A haptic controller comprising:

a base;

a control member having a proximal end, a distal end, and a control support adapted to enable a variable force to be applied at one or more points between the proximal end and the distal end; and a connection member connecting the control member to the base, and having a proximal end and a distal end; wherein the distal end of the connection member is connected to the base by a distal pivot enabling the connection member to pivot relative to the base about an axis X2-X2, and the proximal end of the connection member is connected to the proximal end of the control member by a proximal pivot enabling the control member to pivot relative to the connection member about an axis X1-X1 parallel to the axis X2-X2; and wherein the haptic controller further comprises damper elements arranged respectively between the base and the connection member, and between the connection member and the control member, in order to damp the pivoting of the connection member and of the control member when a force is applied to the control support.

2. The haptic controller according to claim 1, wherein the damper elements are configured so as not to be in alignment relative to a direction normal to the control support.

3. The haptic controller according to claim 2, wherein:

a first damper element arranged between the base and the connection member is arranged in the proximity of the proximal pivot; and a second damper element arranged between the connection member and the control member is arranged in the proximity of the distal.

4. The haptic controller according to claim 1, wherein the connection member has a first segment and a second segment connected together by two spring blades arranged in parallel with each other, so as to enable the control member to move in translation along the axis X1-X1 relative to the base.

5. The haptic controller according to claim 4, wherein said spring blades associated with an adjuster element adapted to modify the stiffness of said spring blades.

6. The haptic controller according to claim 1, wherein said damper elements are elements presenting a deformation profile that is non-linear as a function of the applied force.

7. The haptic controller according to claim 6, wherein said damper elements are deformable section members having a plane base, a curved face opposite from said plane base, and a longitudinal bore.

8. The haptic controller according to claim 1, wherein the control member comprises a control support adapted to receive a removable control surface that may be provided with sensors.

9. The haptic controller according to claim 1, further comprising a controller and sensors adapted to measure the deformation of the damper elements and to deliver an output signal as a function of the measured deformations.

10. The haptic controller according to claim 1, further comprising a controller and sensors adapted to measure the movements of the connection member and of the control member, and to deliver an output signal as a function of the measured movements.

* * * * *